(12) United States Patent
Sakamoto et al.

(10) Patent No.: US 9,777,164 B2
(45) Date of Patent: Oct. 3, 2017

(54) ALLERGEN REDUCING AGENT, AND PROCESSED PRODUCT, COATING MATERIAL, AND WOOD BUILDING MATERIAL USING SAME

(71) Applicant: Panasonic Corporation, Osaka (JP)

(72) Inventors: Kenji Sakamoto, Osaka (JP); Shigeharu Fukuzawa, Nara (JP); Hiroyuki Omura, Osaka (JP); Shoichi Nakamoto, Nara (JP); Kazumasa Rokushima, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 307 days.

(21) Appl. No.: 14/497,475

(22) Filed: Sep. 26, 2014

(65) Prior Publication Data

US 2015/0017337 A1    Jan. 15, 2015

Related U.S. Application Data

(62) Division of application No. 13/811,913, filed as application No. PCT/JP2011/066756 on Jul. 22, 2011, now abandoned.

(30) Foreign Application Priority Data

Jul. 27, 2010  (JP) ................................. 2010-168103
Jul. 27, 2010  (JP) ................................. 2010-168104

(51) Int. Cl.

| | | |
|---|---|---|
| *B05D 1/02* | (2006.01) | |
| *B05D 3/06* | (2006.01) | |
| *B05D 7/06* | (2006.01) | |
| *C09D 5/00* | (2006.01) | |
| *C09D 123/24* | (2006.01) | |
| *C09D 155/00* | (2006.01) | |
| *C09D 5/14* | (2006.01) | |
| *C09D 15/00* | (2006.01) | |
| *C09D 145/00* | (2006.01) | |
| *C08G 65/38* | (2006.01) | |

(52) U.S. Cl.
CPC ................. *C09D 5/00* (2013.01); *B05D 1/02* (2013.01); *B05D 3/067* (2013.01); *B05D 7/06* (2013.01); *C08G 65/38* (2013.01); *C09D 5/14* (2013.01); *C09D 15/00* (2013.01); *C09D 123/24* (2013.01); *C09D 145/00* (2013.01); *C09D 155/00* (2013.01); *Y10T 428/31895* (2015.04)

(58) Field of Classification Search
CPC ..... B05D 1/02; B05D 3/06; B05D 7/06; C09D 123/24; C09D 155/00; C09D 5/00
USPC ............................................... 427/393, 385.5
See application file for complete search history.

(56) References Cited

U.S. PATENT DOCUMENTS

| | | | | |
|---|---|---|---|---|
| 3,553,123 | A * | 1/1971 | Behnke | .................... C09G 1/10 |
| | | | | 106/8 |
| 2001/0014632 | A1* | 8/2001 | Iwami | ................ A63B 37/0003 |
| | | | | 473/378 |
| 2004/0077800 | A1* | 4/2004 | Umeyama | ............ C08G 59/621 |
| | | | | 525/523 |
| 2007/0259055 | A1* | 11/2007 | Hughes | .................. A01N 27/00 |
| | | | | 424/725 |
| 2008/0022645 | A1* | 1/2008 | Skirius | ................. A47C 31/007 |
| | | | | 55/524 |

FOREIGN PATENT DOCUMENTS

| | | | |
|---|---|---|---|
| JP | 61-044821 | A | 3/1986 |
| JP | 6-279273 | A | 10/1994 |
| JP | 11-292714 | A | 10/1999 |
| JP | 2003-081727 | A | 3/2003 |
| JP | 2003-238394 | A | 8/2003 |
| JP | 2004-315779 | A | 11/2004 |
| JP | 2006-304708 | A | 11/2006 |
| JP | 2007-169579 | A | 7/2007 |
| JP | 2008-080210 | A | 4/2008 |
| JP | 2008-239721 | A | 10/2008 |
| WO | WO 01/76371 | A1 | 10/2001 |

OTHER PUBLICATIONS

Hiroshi et al. JP 2006-304708A, English translation.*
Kenji et al. JP 2008-239721 A, English translation.*
English translation of JP2007-169579.*
International Search Report for corresponding International Application No. PCT/JP2011/066756 dated Sep. 13, 2011.
Office Action dated Mar. 27, 2014 for U.S. Appl. No. 13/811,913, filed Jan. 24, 2013.
Office Action dated Jul. 7, 2014 for U.S. Appl. No. 13/811,913, filed Jan. 24, 2013.

* cited by examiner

*Primary Examiner* — Dah-Wei D Yuan
*Assistant Examiner* — Hai Yan Zhang
(74) *Attorney, Agent, or Firm* — Renner, Otto, Boisselle & Sklar, LLP

(57) ABSTRACT

An allergen reducing agent is provided that contains a terpenoid polymer or copolymer as an active component, and that functions to reduce allergens such as mites and pollen, and is capable of suppressing coloring.

7 Claims, No Drawings

ALLERGEN REDUCING AGENT, AND PROCESSED PRODUCT, COATING MATERIAL, AND WOOD BUILDING MATERIAL USING SAME

TECHNICAL FIELD

The present invention relates to allergen reducing agents, and processed products, coating materials, and wood building materials using same.

BACKGROUND ART

In Japan, one in three people is said to suffer from allergic diseases such as atopic dermatitis, bronchial asthma, and allergic rhinitis. Allergic diseases are caused by substances such as mites, pollen, fungi, and pet hairs. Particularly problematic are the allergens from house dust mites, which account for 70% or more of all mites found in rooms (hereinafter, such allergens will be referred to as "mite allergens"). It is said that the body, the dead body, the exuvia, and the feces of house dust mites all can be allergens. Of these, the feces-derived allergens are considered to be most problematic, because these have high allergenic activity, and are very small and are likely to be thrown into air and contact human body.

Because allergens are proteins, the allergenicity can be deactivated by denaturing the proteins through heat or chemical treatments (oxidizing agents, reducing agents, strong acids, strong alkalis). However, the levels of heat, oxidizing agent, reducing agent, strong acid, strong alkali, and other treatments considered safe for home applications are not sufficient for easily denaturing allergens.

As a countermeasure, a method is proposed that chemically denatures an allergen molecule surface under relatively mild conditions. For example, denaturation methods are proposed that use tannic acid (Patent Document 1), tea extracts (Patent Document 2), and hydroxybenzoic compounds or salts thereof (Patent Document 3). Allergen inhibitory effects are confirmed in these methods. An allergen reducing agent is also proposed in which a compound having an aromatic hydroxy compound on the side chains of a linear polymer is used as the active component (Patent Document 4).

CITATION LIST

Patent Documents

Patent Document 1: JP-A-61-44821
Patent Document 2: JP-A-6-279273
Patent Document 3: JP-A-11-292714
Patent Document 4: JP-A-2003-81727

DISCLOSURE OF INVENTION

Problems that the Invention is to Solve

However, almost all of the compounds used in the methods described in Patent Documents 1 to 3 are types of polyphenol and are colored brown. This is problematic in terms of design when these compounds are used by being fixed onto the surface of materials such as clothes, bedding, and building material. Another problem is that, because these compounds are water-soluble, the endurance and persistence of the allergen reducing effect suffer when the compounds are used by being fixed.

On the other hand, the allergen reducing agent described in Patent Document 4 uses a water-insoluble polymer as the linear polymer of the compound used as the active component. The allergen reducing agent is thus highly desirable from the viewpoints of processability and persistence, and can easily be fixed to the surface of materials such as clothes, bedding, and building material. However, the starting raw material used in the allergen reducing agent described in this publication needs to be a phenolic compound having at least one vinyl group, which is expensive, and is high coloring. Accordingly, there is a coloring problem in that the texture of the processed product is damaged when applied to materials such as clothes, bedding, and building materials that require a high level of design.

The present invention has been completed under these circumstances, and it is an object of the present invention to provide an allergen reducing agent that functions to reduce allergens such as mites and pollen, and can suppress coloring. Another object is to provide processed products, coating materials, and wood building materials that use such allergen reducing agents.

Means for Solving the Problems

In order to solve the foregoing problems, an allergen reducing agent of the present invention includes a terpenoid polymer or copolymer as an active component.

It is preferable in the allergen reducing agent that the terpenoid copolymer be a copolymer of terpenoid and an aromatic monomer.

It is preferable in the allergen reducing agent that the terpenoid copolymer be a copolymer of terpenoid and phenol.

It is preferable in the allergen reducing agent that the terpenoid and phenol copolymer have a hydroxyl number of 10 to 250 mgKOH/g.

It is preferable in the allergen reducing agent that the terpenoid be monoterpene.

It is preferable in the allergen reducing agent that the monoterpene be limonene or pinene.

It is preferable in the allergen reducing agent that a double bond derived from the terpenoid be hydrogenated by reaction with hydrogen.

A processed product of the present invention includes the allergen reducing agent above fixed to a surface of the processed product.

A coating material of the present invention contains the allergen reducing agent above, and a curable resin.

A wood building material of the present invention includes a single or multiple functional layers on a surface of a wood base, wherein the layer forming the outermost surface of the single or multiple functional layers is a cured coating of the coating material above.

Advantage of the Invention

The allergen reducing agent of the present invention contains a terpenoid polymer or copolymer as an active component, and thereby functions to reduce allergens. The allergen reducing agent also can suppress coloring. The processed products, coating materials, and wood building materials using the allergen reducing agent also have the allergen reducing function, and can suppress coloring.

MODE FOR CARRYING OUT THE INVENTION

The allergen reducing agent of the present invention contains a terpenoid polymer or copolymer as an active component. Here, the terpenoid polymer is obtained by polymerizing one species of terpenoids alone, and the terpenoid copolymer is obtained by copolymerizing one species of terpenoids and one or more species of other monomers. One or more species of other monomers are monomers that are not terpenoids, or terpenoids different from the terpenoid to be copolymerized. Examples of the monomers other than terpenoids include aromatic monomers, and phenols.

The terpenoid polymer or copolymer may have a weight-average molecular weight of from, for example, about 200 to 10,000.

As used herein, terpenoids are a series of compounds based on the isoprene rule represented by the molecular formula $(C_5H_8)_n$. Examples thereof include terpene hydrocarbons, terpene alcohols, terpene aldehydes, and terpene ketones. These are typically classified into monoterpenes (n=2) and sesquiterpenes (n=3), depending on the number of carbon atoms, and the majority of plant essential oil components fall into these categories. Diterpenes (n=4), sesterterpenes (n=5), and triterpenes (n=6) are members of terpenes having higher molecular weights. Broadly, rosin and natural rubber are also classified as terpenoids, other than essential oils and purified compounds. The carbon skeleton of terpenoids is linear or cyclic (for example, monocyclic or bicyclic). Preferably, n=2 or n=3, particularly preferably n=2.

In the present invention, the raw material terpenoids of the active components may be linear terpene compounds or cyclic terpene compounds. The cyclic terpene compounds may be, for example, monocyclic terpene compounds, or bicyclic terpene compounds. Specific examples thereof include, but are not limited to, the following.

Specific examples of the linear terpene compounds include citronerol, nerol, geraniol, citronellal, and perillaketone. Specific examples of the monocyclic terpene compounds include dipentene, limonene, α-phellandrene, β-phellandrene, α-terpinene, β-terpinene, γ-terpinene, terpinolene, α-terpineol, β-terpineol, γ-terpineol, 4-terpineol, sabinene, para-menthene-1, para-menthene-2, para-menthene-3, para-menthene-8, and para-menthadienes. Specific examples of bicyclic terpene compounds include α-pinene, β-pinene, 1,8-cineole, 1,4-cineole, camphene, tricyclene, Δ2-carene, and Δ3-carene. Of these terpene compounds, the monoterpenes α-pinene, β-pinene, and limonene are preferably used. These terpene compounds may be used either alone or as a mixture of two or more kinds.

Examples of aromatic vinyl monomers include aromatic vinyl monomers represented by, for example, the following formula (1).

[Chemical Formula 1]

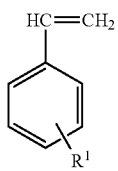

(1)

In the formula (1), $R^1$ represents a substituent that contains a hydrogen atom, a halogen atom, or a carbon atom, and more than one $R^1$ (at most five) may be present on the aromatic ring. When more than one $R^1$ is present, the plurality of $R^1$ may be the same or different.

Examples of the substituent that contains a carbon atom include alkyl groups and alkoxyl groups. The substituent containing a carbon atom may be an aromatic hydrocarbon group that forms a fused ring with the aromatic ring of the formula (1). The alkyl group and the alkoxyl group are of preferably 1 to 4 carbon atoms.

Examples of such aromatic monomers include alkylstyrenes, halogenated styrenes, and alkoxystyrenes. Other examples include vinyl biphenyls, vinyl phenyl naphthalenes, vinyl phenyl anthracenes, halogenated vinyl biphenyls, trialkyl silyl vinyl biphenyls, halogen-substituted alkyl styrene, alkyl silyl styrenes, phenyl group-containing silyl styrenes, halogen-containing silyl styrenes, silyl group-containing silyl styrenes, and mixtures of two or more of these. Vinyl naphthalenes and vinyl anthracenes also may be used, with or without substituents. Specific examples of the alkylstyrenes include styrene, p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, and p-tertiary-butylstyrene. Specific examples of the halogenated styrenes include p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene. Specific examples of the alkoxystyrenes include methoxystyrene, ethoxystyrene, and t-butoxystyrene.

Examples of the phenols include various monocyclic aromatic compounds having one or more hydroxyl groups on the aromatic ring, and polycyclic aromatic compounds such as polynuclear phenols and condensed polycyclic aromatic compounds. Specific examples thereof include, but are not limited to, the following.

Specific examples of the monocyclic aromatic compounds include phenols, and alkyl-substituted phenols such as cresols, xylenols, propylphenols, and p-tertiary-butylphenols. Other examples include halogenophenols such as chlorophenols, and bromophenols. Further examples include aromatic compounds having two or more phenolic hydroxyl groups, such as resorcin, catechol, and hydroquinone. Methoxyphenols represent another example.

Specific examples of the polycyclic aromatic compounds include bisphenols such as bisphenol A, bisphenol F, bisphenol AF, and bisphenol S, naphthols such as naphthol and dihydroxynaphthalene, and hydroxyanthracenes. Other examples include aromatic polymers formed by condensing and polymerizing monomers of these aromatic compounds either alone or as a mixture of two or more with compounds such as formaldehyde, paraformaldehyde, hexamethylenetetramine, 1,3-dioxolan, and dicyclopentadiene. Examples include condensed polymers of bifunctional phenol and formaldehyde. Examples of the bifunctional phenols include those in which the hydrogen atom at the ortho or para position relative to the hydroxyl group of the phenol nucleus is substituted with a substituent (e.g., o-cresol, p-cresol, and p-t-butylphenol), and these may be used either alone or as a mixture of two or more kinds.

The monomers and the condensed polymers of these aromatic compounds may be used either alone or as a mixture of two or more kinds.

The phenols may be those having one or more vinyl groups. Examples thereof include vinylphenols, tyrosines, and 1,2-di(4-hydroxyphenyl)ethenes. These may be used either alone or as a mixture of two or more kinds.

The terpenoid polymer or copolymer is obtained by using known methods. For example, there is a method in which one species of terpenoids, or one species of terpenoids and one or more other monomers are polymerized under heat in the presence of a catalyst.

The proportion of the terpenoid in the monomer group of one species of terpenoids and one or more other monomers is preferably, for example, 50 weight % or more, particularly preferably 70 weight % or more.

Specific examples of the terpenoid polymer or copolymer include polymers and copolymers having a structure represented by, for example, the following formula (2) or (3) in the skeleton.

[Chemical Formula 2]

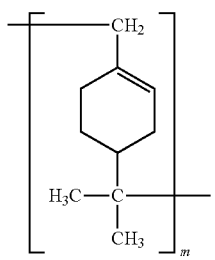
(2)

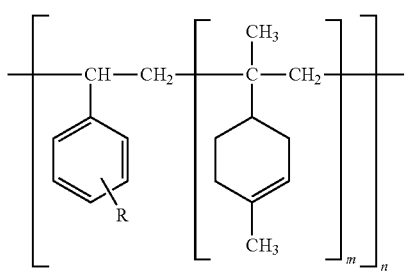
(3)

The symbol m in the formula (2), and m and n in the formula (3) are positive integers. In the formula (3), R represents the same substituent as for $R^1$ in the formula (1), and more than one R (at most five) may be present on the aromatic ring. When more than one R is present, the plurality of R may be the same or different.

Examples of the terpenoid copolymer include copolymers of terpenoid and phenol.

Examples of the terpenoid-phenol copolymer include copolymers of cyclic terpene compounds and phenols. Such copolymers can be obtained by using 0.3 to 12 moles, preferably 0.5 to 6 moles of phenol per mole of the cyclic terpene compound, and by allowing these compounds to react at a temperature of 0 to 120° C. for 1 to 10 hours in the presence of a Friedel-Crafts catalyst. Examples of the Friedel-Crafts catalyst include aluminum chloride, boron trifluoride, and complexes thereof. Specific examples of the copolymers include compounds having a structure represented by, for example, the formula (4) below in the skeleton (m and n in the formula are integers). Compounds with m=1 to 3 are preferably used. Specific examples include the YS Polyster series and the Mighty Ace series available from Yasuhara Chemical. These copolymers have weight-average molecular weights of, for example, 200 to 5,000.

[Chemical Formula 3]

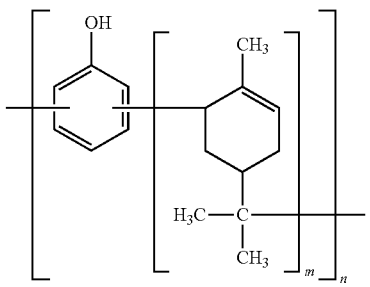
(4)

The terpenoid polymer or copolymer obtained as above can develop an excellent allergen reducing effect. Examples of the allergens include the allergens (Der1, Der2) produced by house dust mites found in large numbers in house dust, the airborne cedar pollen allergens (Cryj1, Cryj2) released in large numbers mainly in spring, and pet-derived allergens such as dog dandruff (Canf1) and cat dandruff (Feld1). The terpenoid polymer or copolymer also can suppress coloring. It is therefore possible to minimize the damage to the texture of the processed product when applied to materials such as clothes, bedding, and building materials that require a high level of design, and the allergen reducing performance and design (low coloring) can be achieved at the same time. The coloring can be further reduced when the terpenoid used is α-pinene, β-pinene, or limonene.

Though there is no clear reason for the allergen reducing performance of the terpenoid polymer or copolymer, it is speculated that the terpenoid has an allergen adsorbing function in its structure, and that the allergens are adsorbed and fixed to provide the allergen reducing performance.

When the terpenoid copolymer is a copolymer of terpenoid and phenol, the copolymer has a stable structure because of the terpenoid-derived terpenoid skeleton and the phenol-derived phenol structure. The compound therefore has low reactivity and low oxidizing property, and is stable with almost no reactivity to water under normal conditions. The copolymer is therefore very highly heat resistant (resistant to discoloration under heat) and chemical resistant. Further, depending on the types of terpenoids and phenols, the coloring of the resulting copolymer can be reduced to make it compatible with various resins.

Using a cyclic terpene compound as the terpenoid for the production of the terpenoid-phenol copolymer provides a wider selection of phenols used as the starting raw material. For example, instead of using the expensive, high-color vinylphenols, the less expensive and low-color phenols having no vinyl groups can be used for the reaction. By selecting a phenol having no vinyl groups for the reaction, the resulting copolymer has a structure in which the phenolic hydroxyl group is incorporated not in the side chain but in the main chain (see the formula (4)), and can thus more easily and more stably develop the excellent allergen reducing function. It is also possible to easily obtain a low-color compound having excellent heat resistance (resistance to discoloration under heat) and excellent chemical resistance.

Further, the color can be further reduced, and the lightfastness can be imparted by using α-pinene, β-pinene, or limonene as the terpenoid, and by using a phenol as the phenol. This also makes it easier to control the softening point and the molecular weight, and to produce a compound having a softening point and a molecular weight suited for the intended use.

In the present invention, the hydroxyl number of the terpenoid-phenol copolymer is preferably 10 to 250 mgKOH/g, more preferably 50 to 120 mgKOH/g.

Generally, higher hydroxyl numbers reduce coloring and improve allergen reducing performance. A material with a hydroxyl number of 10 to 250 mgKOH/g can achieve heat resistance (resistance to discoloration under heat) and chemical resistance, and design (low coloring) without losing allergen reducing performance, and can have excellent compatibility capable of covering a wide range of polarities. Particularly, a material with a hydroxyl number of 50 to 120 mgKOH/g can achieve heat resistance (resistance to discoloration under heat), chemical resistance, and design (low coloring) while developing specific superior allergen reducing performance, and can have excellent compatibility capable of covering a wide range of polarities. Such excellent effects are considered to be due to the very good balance between the terpenoid skeleton conformation and the phenolic hydroxyl group against allergens.

In the present invention, it is preferable that the terpenoid polymer or copolymer react with hydrogen in the presence of a catalyst to hydrogenate the terpenoid-derived double bond. In the case of a terpenoid-phenol copolymer, it is preferable to hydrogenate the terpenoid-derived double bond, because it requires less energy. It is possible, however, to also hydrogenate the phenol-derived double bond.

Examples of the hydrogenation catalyst include noble metals such as palladium, ruthenium, and rhodium. These may be used by being supported on a support such as activated carbon, activated alumina, and diatomaceous earth.

By hydrogenating the terpenoid polymer or copolymer, it is possible to reduce coloring, and to improve heat resistance (resistance to discoloration under heat), chemical resistance, and lightfastness, without losing the allergen reducing performance. Specific examples of the hydrogenated compounds include compounds having a structure represented by, for example, the following formula (5) or (6) in the skeleton.

[Chemical Formula 4]

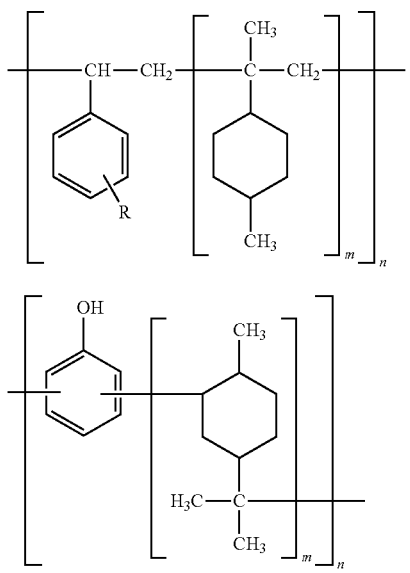

In the formula (5), R represents the same substituent as for $R^1$ in the formula (1), and more than one R (at most five) may be present on the aromatic ring. When more than one R is present, the plurality of R may be the same or different. In the formula (5), m and n are positive integers.

In the formula (6), m and n are positive integers. Compounds with m=1 to 3 are preferably used. Specific examples include the YS Polyster UH115 and TH130 available from Yasuhara Chemical.

The allergen reducing agent of the present invention may contain known allergen inhibitors and hydrophilic polymers, as required, in addition to the terpenoid polymer or copolymer, to the extent that does not interfere with the intended object. The hydrophilic polymers are preferably those capable of forming a reaction field in which interaction can occur with the terpenoid polymer or copolymer. By containing hydrophilic polymers in the allergen reducing agent, allergens can be reduced even more effectively under normal moisture conditions, for example, in the atmosphere with the absolute humidity of 50 $g/m^3$ or less.

The allergen reducing agent of the present invention may be mixed with various additives, as required, in order to improve kneadability for resins, and other physical properties.

Specific examples of the additives include pigments (such as zinc oxide and titanium oxide), inorganic ion exchangers (such as zirconium phosphate and zeolite), dyes, antioxidants, lightfastness stabilizers, fire retardants, antistatic agents, foaming agents, impact resistance enhancers, glass fibers, lubricants (such as a metallic soap), dampproofing agents, bulking agents, coupling agents, nucleating agents, fluidity improvers, deodorants, wood powders, mildewproofing agents, antifouling agents, anti-rusting agents, metal powders, UV absorbers, and UV blockers.

Resin compositions having an allergen reducing function can easily be obtained by mixing the allergen reducing agent with resin. The resin is not particularly limited, and may be any of natural resin, synthetic resin, and semisynthetic resin, and may be thermoplastic resin or heat-curable resin. Examples thereof include molding and fiber resins such as polyethylene, polypropylene, vinyl chloride resin, ABS resin (copolymer resin of acrylonitrile, butadiene, and styrene), AS resin (copolymer resin of acrylonitrile and styrene), MBS (methylmethacrylate.butadiene.styrene) resin, nylon resin, polyester, polyvinylidene chloride, polystyrene, polyacetal, polycarbonate, PBT (polybutylene terephthalate), acrylic resin, fluororesin, polyurethane elastomer, polyester elastomer, melamine resin, urea resin, ethylene tetrafluoride resin, unsaturated polyester resin, rayon, acetate, polyvinyl alcohol, cupra, triacetate, and vinylidene. Other examples include rubber resins such as natural rubber, silicone rubber, styrene-butadiene rubber, ethylenepropylene rubber, fluororubber, nitrile rubber, chlorosulfonated polyethylene rubber, butadiene rubber, butyl rubber, urethane rubber, and acrylic rubber. The allergen reducing agent may be combined with the fibers of natural fibers to produce fibers having an allergen reducing function.

The proportion of the allergen reducing agent mixed in the resin composition containing the allergen reducing agent is preferably 2 to 30 weight parts, more preferably 3 to 10 weight parts with respect to 100 weight parts of the resin composition containing the allergen reducing agent. A desirable allergen reducing effect can be obtained in these content ranges. These ranges are also economical, and the resin physical properties can be suppressed from being lowered.

The resin composition containing the allergen reducing agent may be processed into a resin molded product. Known techniques and machines may be used for the processing, as may be decided according to the properties of the resins. The specific procedures may be in accordance with ordinary methods, and the composition may be processed into various forms, including clump, sponge, film-like, sheet, filamentous, and tubular forms, and complexes of these different forms. The resin composition can easily be prepared by using methods such as mixing, interfusion, and kneading under appropriate temperatures or pressures, for example, under applied heat and increased pressure or reduced pressure.

The usage form of the allergen reducing agent is not particularly limited, and is not limited to mixtures with resin molded products and polymer compounds. For example, the allergen reducing agent may be used in a variety of forms, including a powder, a powder-containing dispersion, a powder-containing particle, a powder-containing coating material, a powder-containing fiber, a powder-containing paper, a powder-containing plastic, and a powder-containing film. Further, the allergen reducing agent may be used along with common methods such as spraying, aerosol, smoking, and heat evaporation methods. Specifically, for example, the allergen reducing agent may be dissolved or dispersed in a solvent to prepare a solution, and the solution may be mixed with a water soluble chemical, an oil solution, an emulsion, a suspension, or the like to provide an allergen reducing agent spray. Examples of the solvent include water (preferably, ion-exchange water), alcohols (such as methyl alcohol, ethyl alcohol, and propyl alcohol), hydrocarbons (such as toluene, xylene, methylnaphthalene, kerosene, and cyclohexane), ethers (such as diethyl ether, tetrahydrofuran, and dioxane), esters (such as butyl acetate, and ethyl acetate), ketones (such as acetone, and methyl ethyl ketone), and amides (such as N,N-dimethylformamide).

A processed product having an enduring allergen reducing function can be obtained by fixing the allergen reducing agent-containing resin composition onto the surface of materials such as clothes, bedding, and building materials.

Allergens can be efficiently reduced by fixing the allergen reducing agent to the surface of the allergen target, specifically the surface of the target where allergens need to be suppressed, by using methods such as spraying, dispersion, coating, kneading, printing, and transfer, as may be decided according to the usage form of the allergen reducing agent.

As used herein, "reducing allergens" means reducing animal allergens, and plant allergens such as pollen. The types of animal allergens for which the allergen reducing agent is particularly effective are allergens produced by mites (mites are organisms of the phylum Arthropoda, the class Arachnida, and the order Acarina, and are broadly classified into seven suborders, including the suborder Notostigmata as represented by the family Opilioacaridae, the suborder Holothyrida as represented by the family Holothyridae, the suborder Metastigmata as represented by *Ixodes ovatus* and *Argas japonicus*, the suborder Mesostigmata as represented by *Ornithonyssus bacoti* and *Dermanyssus hirundinis*, the suborder Prostigmata as represented by *Cheyletus malaccensis* Oudemans and *Tarsonemus granarius*, the suborder Astigmata as represented by house dust mites (such as *Dermatophagoides farinae*) and *Tyrophagus putrescentiae*, and the suborder Cryptostigmata as represented by *Haplochthonius simplex* Willman and *Cosmochthonius reticulatus*). The allergen reducing agent is particularly effective for the allergy-causing house dust mites, found in large numbers in house dust, particularly in bedding.

The allergen reducing agent may be used with a curable resin to form a curable resin composition, and may be used as a coating material formed of such a curable resin composition.

In the case of a coating material, it is preferable to contain the terpenoid polymer or copolymer in 5 to 20 weight parts with respect to 100 weight parts of the coating material solid content in the coating material. A desirable allergen reducing effect can be obtained, and the effect can desirably persist for a long time period in these content ranges. These ranges are also economical, and the physical properties of the coated object surface can be suppressed from being lowered.

Further, with a terpenoid polymer or copolymer content of 20 weight % or less in the coating obtained by curing the coating material, the intended coating functions, specifically the protective function of the base surface can be appropriately obtained.

In the coating material, examples of the curable resin contained in the curable resin composition with the allergen reducing agent include active-energy-ray curable resin, and thermosetting resin.

Examples of the active-energy-ray curable resin include ultraviolet curable resin, and electron-ray curable resin.

Examples of the thermosetting resin include polyester resin, urethane resin, melamine resin, epoxy resin, and silicone resin.

In the coating material, the active-energy-ray curable resin is preferably used, because it can easily produce a dense, enduring cured coating in a short time period.

A coating material of the curable resin composition using active-energy-ray curable resin is described below.

The coating material of the curable resin composition contains at least one selected from a reactive oligomer and a reactive monomer as the active-energy-ray curable resin, in addition to the allergen reducing agent.

Coating strength such as contamination resistance and abrasion resistance can be improved by mixing the reactive oligomer in the curable resin composition. The reactive oligomer is a resin obtained by polymerizing a light-curable (meth)acrylate monomer that contains preferably two or more acryloyl groups or methacryloyl groups per molecule. Examples of the reactive oligomer include urethane(meth)acrylate, polyester(meth)acrylate, polyether(meth)acrylate, epoxy(meth)acrylate, polybutadiene(meth)acrylate, silicone (meth)acrylate, and copolymerization (meth)acrylates obtained by introducing an acryloyl group or a methacryloyl group to the side chain of an acrylic acid ester copolymer. It is also possible to use copolymers that contain a unit derived from a fluorine-containing olefin, a unit derived from a polymerizable unsaturated group-containing silicone, or a unit derived from a hydroxyl group-containing unsaturated ether.

The reactive oligomers may be used either alone or in a combination of two or more kinds. Preferably, urethane acrylates having three or more acryloyl groups per molecule, or ester-modified epoxy acrylates are used.

The reactive oligomer has a molecular weight (Mw) of preferably 500 to 4,000. A molecular weight (Mw) of 500 or more is preferable, because it can provide sufficient coating strength. A molecular weight (Mw) of 4,000 or less is preferable, because it can easily provide a desirable balance between the viscosity, contamination resistance, and the anti-allergen performance of the curable resin composition.

The mixed amount of the reactive oligomer is preferably 10 to 70 weight %, more preferably 20 to 50 weight % with respect to the solid content of the coating material in the curable resin composition. A mixed amount of 10 weight % or more is preferable, because it can provide sufficient coating strength. A mixed amount of 70 weight % or less is preferable, because it prevents the coating from being too hard and makes the coating less likely to be brittle.

The reactive monomer is used as a reactive diluent or a crosslinker. Specific examples of the reactive monomer include acrylic acid, (meth)acrylic acid, acryloyl morpholine, N-vinylformamide, 2-ethylhexyl acrylate, lauryl acrylate, isobornyl acrylate, 3-methoxydibutyl acrylate, ethyl carbitol acrylate, methoxytripropylene glycol acrylate, phenoxyethyl acrylate, phenoxypolyethylene glycol acrylate, 2-ethylhexyl acrylate, 1,4-butanediol diacrylate, 1,6-hexanediol diacrylate, neopentyl glycol diacrylate, hydroxypivalic acid neopentyl glycol acrylate, 2-(2-ethoxyethoxy)ethyl acrylate, tetrahydrofurfuryl acrylate, 2-phenoxyethyl acrylate, diethylene glycol diacrylate, tetraethylene glycol diacrylate, 1,3-butyleneglycol diacrylate, tripropylene glycol diacrylate, 1,9-nonanediol diacrylate, 1,10-decanediol diacrylate, tricyclodecanedimethanol diacrylate, glycerine triacrylate, trimethylolpropane triacrylate, pentaerythritol tetraacrylate, pentaerythritoltriacrylate, ditrimethylolpropane tetraacrylate, dipentaerythritol hexaacrylate, dipentaerythritol penta(hexa)acrylate, methoxypolyethylene glycol #400 acrylate, isocyanuric acid ethylene oxide-modified diacrylate, and tris(acryloxy ethyl)isocyanurate. These may be used either alone or in a combination of two or more kinds.

Among the reactive monomers above, the monomers having 1 to 3 (meth)acryloyl groups and a Tg (glass transition point) of 100° C. or more can improve the contamination resistance, the abrasion resistance, and the crack resistance of the curable resin coating when mixed with the curable resin composition. Examples of such monomers having a Tg of 100° C. or more include isobornyl acrylate, 2-hydroxy-3-phenoxypropyl acrylate, acryloyl morpholine, tricyclodecane dimethylol di(meth)acrylate, isocyanuric acid ethylene oxide-modified diacrylate, and tris(acryloxy ethyl)isocyanurate. These may be used either alone or in a combination of two or more kinds.

Further, among the reactive monomers above, the aliphatic hydrocarbon monomers having 1 to 2 (meth)acryloyl groups can reduce the viscosity of the curable resin composition, without lowering the allergen reducing performance when they are mixed therein.

Because the allergen reducing agent has functional groups having high binding ability to hydrogen, interaction occurs with the polymers having carbonyl groups or ether groups. Sufficient allergen reducing performance may not develop when a hydrogen bonding interaction occurs between the polymer and the functional group having high binding ability to hydrogen, specifically the active site of allergenic substance deactivation. The viscosity of the curable resin composition can be reduced without lowering the allergen reducing performance with the use of aliphatic hydrocarbon monomers capable of dispersing the allergen reducing agent.

Examples of the aliphatic hydrocarbon monomers include 1,4-butanediol diacrylate, 1,6-hexanediol diacrylate, neopentyl glycol diacrylate, hydroxypivalic acid neopentyl glycol acrylate, 1,9-nonanediol diacrylate, 1,10-decanediol diacrylate, glycerine triacrylate, trimethylolpropane triacrylate, and pentaerythritol triacrylate. These may be used either alone or in a combination of two or more kinds.

The mixed amount of the reactive monomer is preferably 3 to 45 weight %, more preferably 5 to 40 weight % with respect to the coating material solid content in the curable resin composition from the standpoint of reducing the viscosity of the curable resin composition without lowering the allergen reducing performance while maintaining other physical properties of the coating.

A photopolymerization initiator may be mixed in the curable resin composition, in addition to the allergen reducing agent, the reactive oligomer, and the reactive monomer, provided that such addition is not detrimental to the effects of the present invention.

The photopolymerization initiator may be of hydrogen abstraction type, or intramolecular cleavage type.

Examples of the hydrogen abstraction photopolymerization initiators include benzophenone/amine photopolymerization initiators, Michler's ketone/benzophenone photopolymerization initiators, and thioxanthone/amine photopolymerization initiators.

Examples of the intramolecular cleavage photopolymerization initiators include benzoin photopolymerization initiators, acetophenone photopolymerization initiators, benzophenone photopolymerization initiators, thioxanthone photopolymerization initiators, and acylphosphine oxide photopolymerization initiators. Particularly preferred are the highly reactive acetophenone compound 2,2-dimethoxy-2-phenylacetophenone, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, phenylglyoxylic acid methyl ester, and acylphosphine oxide compounds, such as monoacylphosphine oxide and bisacylphosphine oxide, having an extended absorption edge toward longer wavelengths.

The mixed amount of the photopolymerization initiator is preferably 1 to 10 weight %, more preferably 3 to 6 weight % with respect to the coating material solid content in the curable resin composition from the standpoint of improving reactivity and maintaining the coating physical properties.

Additives may by mixed in the curable resin composition, in addition to the allergen reducing agent, the reactive oligomer, the reactive monomer, and the photopolymerization initiator, provided that such addition is not detrimental to the effects of the present invention. Examples of such additives include waxes, antimicrobial agents, mildew-proofing agents, unreactive diluents, polymerization inhibitors, matting agents, defoaming agents, sedimentation preventing agents, leveling agents, dispersants, heat stabilizers, and UV absorbers.

The coating material is obtained by adding the allergen reducing agent to, for example, a solution prepared by dissolving of the reactive oligomer, the reactive monomer, and the photopolymerization initiator in a solvent. When dissolving these components in a solvent, heat may be applied, as required, or additives such as waxes, antimicrobial agents, mildew-proofing agents, unreactive diluents, polymerization inhibitors, matting agents, defoaming agents, sedimentation preventing agents, leveling agents, dispersants, heat stabilizers, and UV absorbers may be added.

Common solvents used for coating materials and inks may be used as the solvent. Specific examples include aromatic hydrocarbons such as toluene and xylene, ketones such as acetone, methyl ethyl ketone, methyl isobutyl ketone, and cyclohexanone, acetates such as ethyl acetate, isopropyl acetate, butyl acetate, and amyl acetate, alcohols such as methyl alcohol, ethyl alcohol, and isopropyl alcohol, ethers such as dioxane, tetrahydrofuran, and diisopropyl ether, and mixtures of two or more of these. Solvents of high electron donating capability, such as ketones and acetates are preferred, because these can dissolve the components more easily.

The solvent may be used in 30 weight % or less in the coating material. Drying is smooth, and the production speed does not slow greatly when the solvent is added in 30 weight % or less.

The coating material obtained as above contains the allergen reducing agent, and therefore has an allergen reducing function. Coloring also can be suppressed. Thus, an excellent allergen reducing function can be imparted to the cured coating surface by applying the coating material to materials such as a wood base and curing the coating material. It is also possible to obtain a processed product in which coloring is suppressed.

An example of the processed product is a wood building material. The wood building material includes, for example, a single or multiple functional layers on a wood base surface. The layer forming the outermost surface of the functional layer is the coating formed by applying and curing the coating material. The functional layer may be a single layer of the coating, or may be formed by multiple layers containing the coating. For example, the functional layer may be configured from a color layer, and one or more clear layers laminated on the surface of the color layer. The layer forming the outermost surface of the clear layer is the cured coating of the coating material. When the functional layer is a single layer, the cured coating of the coating material is formed as a clear layer on the wood base surface, for example.

In this type of wood building material, it is preferable that the clear layer be as colorless and transparent as possible, in order to preserve the color texture developed by the color layer, and the wood texture of the wood base. The allergen reducing agent contained in the coating material contains the terpenoid polymer or copolymer, and can thus effectively suppress the coloring of the cured coating of the coating material. Further, because the influence of the cured coating on the finished appearance (color) of the wood building material can be reduced, the wood building material can have an even more desirable finished appearance while maintaining desirable coating physical properties and the desirable allergen reducing effect. When the terpenoid copolymer is a terpenoid-phenol copolymer, desirable heat resistance and chemical resistance can be imparted to the wood building material because of the heat resistance and the chemical resistance of the copolymer.

In the wood building material, a base sheet of synthetic resin such as polypropylene resin (PP resin) may be disposed between the wood base and the functional layer. In this type of wood building material, for example, the base sheet and the functional layer formed on the front-surface side of the base sheet form a decorative sheet, and the wood base is attached to the back-surface side of the decorative sheet with an adhesive or the like. Further, a backer layer of synthetic resin such as PP resin may be disposed on the back-surface side of the decorative sheet, and the wood base may be attached to the back-surface side of the backer layer with an adhesive or the like to form a wood building material.

Examples of the wood base used for the wood building material include plyboards and particle boards, medium density fiber boards, composite boards of wood powder and resin (wood plastic boards), and configurations in which a single wood board or a decorative sheet is bonded as a surface decorative member onto a bedplate produced by combining the wood base boards exemplified above.

When the wood building material is applied to floor material or wall material, the wood base may be groove finished or joint finished to improve design. Further, the wood base may be color coated, or primer coated to improve base adhesion and to prevent cracking. The primer coating may be followed by middle coating.

Desirably, the coating is applied to make the coating thickness about 1 to 100 μm, preferably about 3 to 15 μm after the curing. The number of clear layer applications is not particularly limited, and the clear layer may be applied once, or more than once. Coating may be performed by using known methods, including a flow coating method, a roll coating method, a blow method, an air-less spraying method, an air spraying method, a brush coating method, a trowel coating method, a dipping method, a lifting method, a nozzle method, a winding method, a flowing method, a filling method, and a patching method, either by automation or by hand.

The coating may be cured by irradiation of active energy rays such as UV rays and electron rays, which is conventionally known, when the curable resin forming the curable resin composition is an active-energy-ray curable resin.

The present invention is described below in greater detail by using examples. It should be noted, however, that the present invention is not limited by the following examples.

EXAMPLES

Example 1

A terpene resin (YS resin 1250; Yasuhara Chemical; a compound having the structure of the formula (2) in the skeleton; 30 weight parts) was dissolved in a thinner (xylene:toluene=1:1; 60 weight parts) to produce an allergen reducing agent solution.

Example 2

An allergen reducing agent solution was produced in the same manner as in Example 1, except that an aromatic modified terpene resin (YS resin TO125; Yasuhara Chemical; a compound having the structure of the formula (3) in the skeleton, where R is a hydrogen atom) was used instead of the terpen resin YS resin 1250.

Example 3

A terpene phenolic resin (YS Polyster T130; Yasuhara Chemical; a compound having the structure of the formula (4) in the skeleton, where m=1; hydroxyl number of 60 mgKOH/g; 30 weight parts) was dissolved in a thinner (butyl acetate:ethyl acetate:methyl ethyl ketone=1:1:1; 60 weight parts) to produce an allergen reducing agent solution.

Example 4

An allergen reducing agent solution was produced in the same manner as in Example 3, except that a terpene phenolic resin (Mighty Ace K145; Yasuhara Chemical; a compound having the structure of the formula (4) in the skeleton, where m=3; hydroxyl number of 200 mgKOH/g) was used instead of the terpene phenolic resin YS Polyster T130 used in Example 3.

Example 5

An allergen reducing agent solution was produced in the same manner as in Example 3, except that a hydrogenated terpene phenolic resin (YS Polyster TH130; Yasuhara Chemical; a compound having the structure of the formula (6) in the skeleton, where m=1; hydroxyl number of 60 mgKOH/g) was used instead of the terpene phenolic resin YS Polyster T130 used in Example 3.

Comparative Example 1

An allergen reducing agent solution was produced in the same manner as in Example 1, except that a polyvinyl phenolic resin (Maruka Lyncur M; Maruzen Petrochemical; a compound having the structure of the following formula (7) in the skeleton; where n is a positive integer) was used instead of the terpene resin YS resin 1250 used in Example 1.

[Chemical Formula 5]

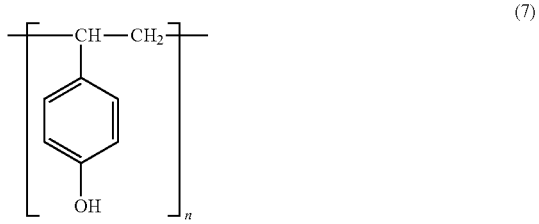

(7)

The allergen reducing agent solutions obtained in Examples 1 to 5 and Comparative Example 1 were measured for hue and allergen reducing performance (percentage allergen reduction). The results are presented in Table 1.
<Hue Measurement>

The hue of the allergen reducing agent solution was measured by using the Gardner method. Evaluations were performed in the scale of 0 to 18. (0: colorless transparent; the color turns more brownish as the number increases).
<Measurement of Allergen Reducing Performance>
1) Preparation of Allergen Solution An allergen solution was produced by dissolving an allergen freeze dried powder (purified mite antigen; Der2; Asahi Breweries Ltd.) in a phosphate buffer (pH7.6) so as to provide an allergen protein amount of 100 ng/ml.
2) Sample Preparation The allergen reducing agent solution was applied to a PET film with a bar coater #20, and dried at 80° C. for 30 min.
3) Reaction The allergen solution prepared in procedure 1) was dropped onto each film produced in procedure 2) and onto an unprocessed PET film in 400 µl portions, and the allergen protein amount was measured with an ELISA kit (Indoor) after 6 hours of reaction. The percentage allergen reduction was calculated as follows.

Percentage allergen reduction (%)=100×(1−$A/B$)

A: allergen protein amount (ng/ml) on the film obtained in procedure 2) as measured after 6 hours B: allergen protein amount (ng/ml) on the unprocessed PET film as measured after 6 hours

TABLE 1

|  | Hue (Gardner method) | Percentage allergen reduction (%) |
| --- | --- | --- |
| Ex. 1 | 3 | 87.8 |
| Ex. 2 | 1 or less | 89.9 |
| Ex. 3 | 4.5 | 90.8 |
| Ex. 4 | 4.5 | 79.5 |

TABLE 1-continued

|  | Hue (Gardner method) | Percentage allergen reduction (%) |
| --- | --- | --- |
| Ex. 5 | 1 or less | 85.1 |
| Com. Ex. 1 | 17 | 75.6 |

It was confirmed from the results presented in Table 1 that the allergen reducing agent solutions obtained in Examples 1 to 5 had less coloring than the allergen reducing agent solution obtained in Comparative Example 1. It was also confirmed that the processed products obtained by applying the allergen reducing agent solutions of Examples 1 to 5 had excellent allergen reducing performance, as did the processed product obtained by applying the allergen reducing agent solution of Comparative Example 1 containing a conventional allergen reducing agent.

Example 6

A light-curable coating material was obtained by adding and stirring a terpene phenolic resin (YS Polyster T130; Yasuhara Chemical; 10 weight parts), urethane acrylate (product name: Shikou 7550B; Nippon Synthetic Chemical Industry Co., Ltd.; 30 weight parts), trimethylolpropane triacrylate (EO addition; product name: M310; Toagosei Co., Ltd.; 16 weight parts), tripropylene glycol (product name: M220; Toagosei Co., Ltd.; 18 weight parts), 1,9-nonanediol diacrylate (product name: L-9CA; Dai-Ichi Kogyo Seiyaku Co., Ltd.; 18 weight parts), methoxyglycol acrylate (product name: ME-3; Dai-Ichi Kogyo Seiyaku Co., Ltd.; 18 weight parts), hydrophobic silica (product name: Sylophobic 702; Fuji Silysia Chemical Ltd.; 5 weight parts), acrylic beads (product name: GM0401S; Ganz Chemical Co., Ltd.; 5 weight parts), and a photopolymerization initiator (product name: MBF; Ciba; 5 weight parts).

Example 7

A light-curable coating material was obtained in the same manner as in Example 6, except that a terpene phenolic resin (Mighty Ace K145; Yasuhara Chemical) was used instead of the terpene phenolic resin YS Polyster T130 used in Example 6.

Example 8

A light-curable coating material was obtained in the same manner as in Example 6, except that the hydrogenated terpene phenolic resin YS Polyster TH130 was used instead of the terpene phenolic resin YS Polyster T130 used in Example 6.

Comparative Example 2

A light-curable coating material was obtained in the same manner as in Example 6, except that the polyvinylphenolic resin Maruka Lyncur M (Maruzen Petrochemical) was used instead of the terpene phenolic resin YS Polyster T130 used in Example 6.

Comparative Example 3

A light-curable coating material was obtained in the same manner as in Example 6, except that the terpene phenolic resin YS Polyster T130 used in Example 6 was not mixed.

The light-curable coating materials obtained in Examples 6 to 8 and Comparative Examples 2 and 3 were each applied to a white olefin sheet subjected beforehand to a pre-coating process with a bar coater #10, and cured by ultraviolet irradiation (illuminance of 350 to 400 mj/cm) to obtain a processed sheet.

The processed sheets were measured for hue (coloring property), allergen reducing performance (percentage allergen reduction), heat resistance (resistance to discoloration under heat), lightfastness (resistance to discoloration under light), and chemical resistance. The results are presented in Table 2.

$\Delta E \leq 0.5$: Excellent $0.5 < \Delta E < 1$: Good $\Delta E \geq 1$: Poor <Evaluation of Chemical Resistance>

An alkali detergent (product name: Domestos; Unilever) was dropped onto each processed sheet, and the presence or absence of any abnormality in appearance was checked after retention for 24 hours.

TABLE 2

| | Hue (Coloring property) ($\Delta E$) | Percentage allergen reduction (%) | Heat resistance ($\Delta E$) | Lightfastness ($\Delta E$) | Chemical resistance (Resistance to alkali detergent) |
|---|---|---|---|---|---|
| Ex. 6 | Good | 93.5 | Excellent | Good | No abnormality |
| Ex. 7 | Good | 85.6 | Excellent | Good | No abnormality |
| Ex. 8 | Excellent | 91.2 | Excellent | Excellent | No abnormality |
| Com. Ex. 2 | Poor | 83.4 | Poor | Poor | No abnormality |
| Com. Ex. 3 | Good | Reference (Terpene phenol resin was not mixed) | Good | Excellent | No abnormality |

<Hue (Coloring Property) Measurement>

The processed sheets were measured for color difference $\Delta E$ with a color-difference meter. Evaluations were made according to the following criteria.

$\Delta E \leq 1$: Excellent $1 < \Delta E < 2$: Good $\Delta E \geq 2$: Poor

<Measurement of Allergen Reducing Performance>

1) Preparation of Allergen Solution

An allergen solution was produced by dissolving an allergen freeze dried powder (purified mite antigen; Der2; Asahi Breweries Ltd.) in a phosphate buffer (pH 7.6) so as to provide an allergen protein amount of 20 ng/ml.

2) Reaction

The allergen solution prepared in procedure 1) was dropped onto the processed sheets in 400 μl portions, and the allergen protein amount was measured with an ELISA kit (Indoor) after 6 hours of reaction. The percentage allergen reduction was calculated as follows.

Percentage allergen reduction (%)=100×(1−$A/B$)

A: allergen protein amount (ng/ml) on the processed sheet using the light-curable coating materials of Examples 6 to 8 and Comparative Example 2 as measured after 6 hours B: allergen protein amount (ng/ml) on the processed sheet using the light-curable coating material of Comparative Example 3 as measured after 6 hours <Evaluation of Heat Resistance (Resistance to Discoloration Under Heat)>

Each processed sheet was maintained at 80° C. for 96 hours. After the testing, the sheet was measured for color difference $\Delta E$ with a color-difference meter. Evaluations were made according to the following criteria.

$\Delta E \leq 1$: Excellent $1 < \Delta E < 2$: Good $\Delta E \geq 2$: Poor

<Evaluation of Lightfastness (Resistance to Discoloration Under Light)>

Each processed sheet was irradiated in a fade test (Xe lamp) for 48 hours. After the testing, the sheet was measured for color difference $\Delta E$ with a color-difference meter. Evaluations were made according to the following criteria.

It was confirmed from the results present in Table 2 that the processed sheets obtained by applying the light-curable coating materials of Examples 6 to 8 had less coloring and superior heat resistance and lightfastness compared to the processed sheet obtained by applying the light-curable coating material of Comparative Example 2 containing a conventional allergen reducing agent. It was also confirmed that the allergen reducing performance and chemical resistance were excellent.

Example 9

A beech lumber single board having a thickness of 0.2 mm was bonded to an 11.8 mm-thick lauan plywood, and a V groove was formed to produce a floor wood base. Then, an aqueous coloring agent was applied to the wood base. After drying the wood base at 80° C. for 1 min, a UV curable urethane acrylate primer coating material was applied to the wood base with a sponge roller. The coating material was scraped off with a metal reverse rotating roller to make the total coating amount 2 g/shaku$^2$. After further applying the coating in 1 g/shaku$^2$ with a rubber roller, the coating was cured by UV irradiation at a cumulative illuminance of 100 mJ/cm$^2$. Thereafter, a UV curable urethane acrylate middle coating material mixed with 30 parts of antifriction white alumina was applied twice with a rubber roller in a total of 2 g/shaku$^2$ to form a first middle coating, and the coating was cured by UV irradiation at a cumulative illuminance of 200 mJ/cm$^2$. This was followed by polishing with a #320 sandpaper. Thereafter, a UV curable urethane acrylate middle coating material was applied with a sponge roller and a rubber roller in a total of 2 g/shaku$^2$, and then with a flow coater in 7 g/shaku$^2$ to form a second middle coating. The coating was then cured by UV irradiation at a cumulative illuminance of 100 mJ/cm$^2$.

Further, the light-curable coating material obtained in Example 6 was applied with a rubber roller in 1 g/shaku$^2$, and cured by UV irradiation at a cumulative illuminance of 350 mJ/cm$^2$ to produce a wood floor material.

Example 10

A wood floor material was produced in the same manner as in Example 9, except that the light-curable coating material obtained in Example 7 was used instead of the light-curable coating material obtained in Example 6 which was used in Example 9.

Example 11

A wood floor material was produced in the same manner as in Example 9, except that the light-curable coating material obtained in Example 8 was used instead of the light-curable coating material obtained in Example 6 which was used in Example 9.

Example 12

A pictorial pattern layer (2 μm) was formed on 0.06 mm-thick colored polypropylene (base sheet) by printing. Then, a 0.08 mm-thick transparent polypropylene resin film was bonded onto the pictorial pattern layer with a urethane-based dry laminate adhesive to form a transparent resin layer. Thereafter, the light-curable coating material obtained in Example 6 was applied onto the transparent resin layer with a rubber roller in 1 g/shaku$^2$. The coating was then irradiated with UV rays at a cumulative illuminance of 350 mJ/cm$^2$ to produce a decorative sheet.

Then, a urethane-based adhesive was applied to the back surface of the decorative sheet, and a PP resin backer layer was attached. A wood base composed of plyboard wood base was then bonded to the back side of the backer layer using a urethane-modified ethylene-vinyl acetate emulsion adhesive to produce a wood floor material.

Example 13

<Allergen Reducing Agent-Containing Coating Material>

An allergen reducing agent-containing coating material was obtained by adding and stirring the allergen reducing agent, specifically the terpene phenolic resin YS Polyster T130 (Yasuhara Chemical; 10 weight parts), urethane acrylate (product name: Shikou 7550B; Nippon Synthetic Chemical Industry Co., Ltd.; 30 weight parts), trimethylolpropane triacrylate (EO addition; product name: M310; Toagosei Co., Ltd.; 20 weight parts), 1,9-nonanediol diacrylate (product name: L-9CA; Dai-Ichi Kogyo Seiyaku Co., Ltd.; 50 weight parts), hydrophobic silica (product name: Sylophobic 702; Fuji Silysia Chemical Ltd.; 5 weight parts), and acrylic beads (product name: GM0401S; Ganz Chemical Co., Ltd.; 5 weight pans).

<Wood Floor Material with Allergen Reducing Agent-Containing Coating Material Applied Thereon>

A pictorial pattern layer (2 μm) was formed on a 0.06 mm-thick colored polypropylene sheet (base sheet) by printing. Then, a 0.08 mm-thick transparent polypropylene resin film was bonded onto the pictorial pattern layer using a urethane-based dry laminate adhesive. Thereafter, the allergen reducing agent-containing coating material was applied onto the transparent resin layer with a rubber roller in 1 g/shaku$^2$. The coating was then cured by irradiation of 30 kGy electron rays at an acceleration voltage of 125 eV to produce a decorative sheet.

Then, a urethane-based adhesive was applied to the back surface of the decorative sheet, and a PP resin backer layer was attached. A wood base composed of plyboard wood base was then bonded to the back side of the backer layer using a urethane-modified ethylene-vinyl acetate emulsion adhesive to produce a wood floor material.

Comparative Example 4

A wood floor material was produced in the same manner as in Example 9, except that the light-curable coating material obtained in Comparative Example 2 was used instead of the light-curable coating material obtained in Example 6 which was used in Example 9.

Comparative Example 5

An allergen reducing agent-containing coating material was produced in the same manner as in Example 13, and a wood floor material was also produced in the same manner as in Example 13, except that the polyvinylphenolic resin Maruka Lyncur M was used instead of the terpene phenolic resin YS Polyster T130 used in Example 13.

Comparative Example 6

A wood floor material was produced in the same manner as in Example 9, except that the light-curable coating material obtained in Comparative Example 3 was used instead of the light-curable coating material obtained in Example 6 which was used in Example 9.

Comparative Example 7

An allergen reducing agent-containing coating material was produced in the same manner as in Example 13, and a wood floor material was also produced in the same manner as in Example 13, except that the terpene phenolic resin YS Polyster T130 used in Example 13 was not mixed.

The wood floor materials obtained in Examples 9 to 13 and Comparative Examples 4 to 7 were measured for hue (coloring property), allergen reducing performance, heat resistance (resistance to discoloration under heat), lightfastness (resistance to discoloration under light), and chemical resistance. The results are presented in Table 3.

The hue (coloring property), heat resistance (resistance to discoloration under heat), and lightfastness (resistance to discoloration under light) were measured and evaluated by using the same methods and according to the same criteria used for the processed sheets, and explanations thereof are omitted.

<Measurement of Allergen Reducing Performance>
1) Preparation of Allergen Solution An allergen solution was produced by dissolving an allergen freeze dried powder (purified mite antigen; Der2; Asahi Breweries Ltd.) in a phosphate buffer (pH7.6) so as to provide an allergen protein amount of 20 ng/ml.

2) Reaction

The allergen solution prepared in procedure 1) was dropped onto the wood floor materials prepared in Examples 9 to 13 and Comparative Examples 4 to 7 in 400 μl portions, and the allergen protein amount was measured with an ELISA kit (Indoor) after 6 hours of reaction. The percentage allergen reduction was calculated as follows.

Percentage allergen reduction (%)=100×(1−$A/B$)

A: allergen protein amount (ng/ml) on the wood floor materials of Examples 9 to 13 and Comparative Examples 4 and 5 as measured after 6 hours B: allergen protein amount (ng/ml) on the wood floor material of Comparative Examples 6 and 7 as measured after 6 hours.

<Evaluation of Chemical Resistance>

An alkali detergent (product name: Domestos; Unilever) was dropped onto each wood floor material obtained in Examples 9 to 13 and Comparative Examples 4 to 7, and the presence or absence of any abnormality in appearance was checked after retention for 24 hours. Evaluations were made according to the following criteria.

No abnormality in appearance: Good
Abnormality in appearance (yellowing): Poor

TABLE 3

| | Hue Coloring property) (ΔE) | Percentage allergen reduction (%) | Heat resistance (ΔE) | Lightfastness (ΔE) | Chemical resistance (Resistance to alkali detergent) |
|---|---|---|---|---|---|
| Ex. 9 | Good | 93.5 | Excellent | Good | Good |
| Ex. 10 | Good | 85.6 | Excellent | Good | Good |
| Ex. 11 | Excellent | 91.2 | Excellent | Excellent | Good |
| Ex. 12 | Good | 92.1 | Excellent | Good | Good |
| Ex. 13 | Good | 89.5 | Excellent | Excellent | Good |
| Com. Ex. 4 | Poor | 83.4 | Poor | Poor | Good |
| Com. Ex. 5 | Poor | 25.3 | Poor | Excellent | Poor (Turned yellow) |
| Com. Ex. 6 | Excellent | Reference (Terpene phenol resin was not mixed) | Good | Excellent | Good |
| Com. Ex. 7 | Excellent | Reference (Terpene phenol resin was not mixed) | Good | Excellent | Good |

It was confirmed from the results presented in Table 3 that the wood floor materials of Examples 9 to 13 had excellent allergen reducing performance, less coloring, and excellent heat resistance (resistance to discoloration under heat), lightfastness, and chemical resistance.

The invention claimed is:

1. A method for reducing an allergen comprising imparting an allergen reducing function to a surface of a target where allergens need to be suppressed by applying an allergen reducing agent containing, as an active component to the surface of the target, at least one of:

a terpenoid-phenol copolymer having a structure represented by:

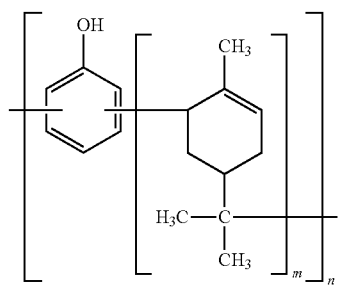

wherein m and n are positive intergers; or a terpenoid-phenol copolymer having a structure represented by:

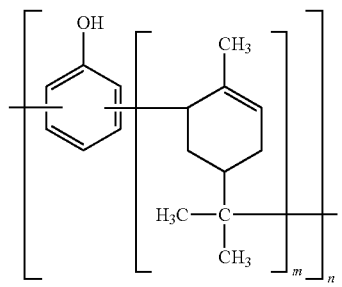

wherein m and n are positive intergers.

2. The method for reducing an allergen according to claim 1, wherein the terpenoid-phenol copolymer has a hydroxyl number of 10 to 250 mgKOH/g.

3. The method for reducing an allergen according to claim 1, wherein a coating material containing the allergen reducing agent and a curable resin is applied to the surface of the target and cured.

4. The method for reducing an allergen according to claim 1, wherein the surface of the target is a surface of a wood base.

5. The method for reducing an allergen according to claim 1, wherein the allergen reducing agent contains the terpenoid-phenol copolymer having the structure represented by:

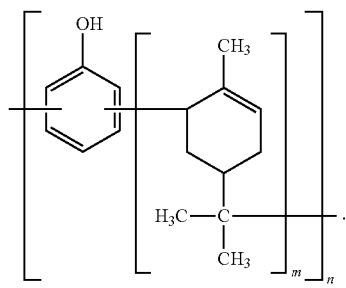

6. The method for reducing an allergen according to claim 1, wherein the allergen reducing agent contains the hydrogenated terpenoid-phenol copolymer having the structure represented by:

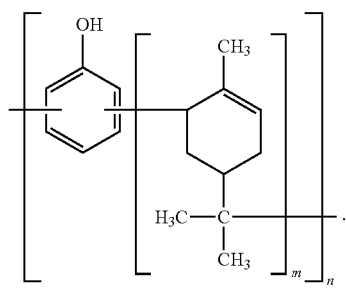

7. The method for reducing an allergen according to claim 1, wherein the allergen reducing agent contains the terpenoid-phenol copolymer having the structure represented by:
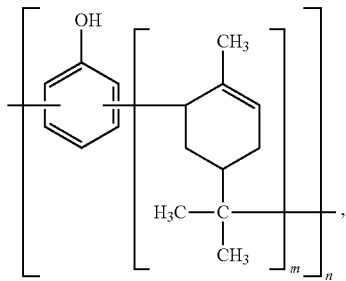
and contains the hydrogenated terpenoid-phenol copolymer having the structure represented by:
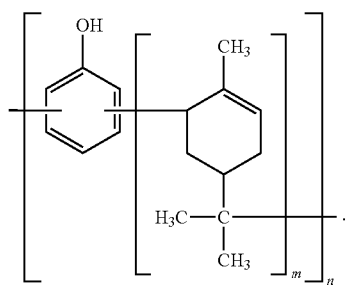
* * * * *